United States Patent
Kuo

(10) Patent No.: US 10,468,986 B2
(45) Date of Patent: Nov. 5, 2019

(54) VOLTAGE CONVERTING APPARATUS FOR IMPROVE STABILITY OF THE COMPARISON OPRERATION THEREOF

(71) Applicant: Excelliance MOS Corporation, Hsinchu County (TW)

(72) Inventor: Yueh-Lung Kuo, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 0 days.

(21) Appl. No.: 16/028,426

(22) Filed: Jul. 6, 2018

(65) Prior Publication Data
US 2019/0305680 A1 Oct. 3, 2019

(30) Foreign Application Priority Data

Apr. 3, 2018 (TW) .............................. 107111750 A

(51) Int. Cl.
*H02M 3/158* (2006.01)
(52) U.S. Cl.
CPC ................... *H02M 3/158* (2013.01)
(58) Field of Classification Search
CPC ................... H02M 3/156–15888; H02M 3/335
USPC .......................................... 323/271–289, 315
See application file for complete search history.

(56) References Cited

U.S. PATENT DOCUMENTS

| | | | | |
|---|---|---|---|---|
| 5,532,626 A | * | 7/1996 | Khayat | G01R 19/155 323/282 |
| 7,132,820 B2 | | 11/2006 | Walters et al. | |
| 7,683,595 B2 | * | 3/2010 | Feldtkeller | G05F 1/70 323/282 |
| 7,936,158 B2 | * | 5/2011 | Noda | H02M 3/1588 323/282 |
| 8,054,056 B2 | * | 11/2011 | Coleman | H02M 1/15 323/282 |
| 8,384,362 B2 | * | 2/2013 | Cheng | G05F 1/10 323/222 |
| 8,416,588 B2 | | 4/2013 | Chen | |
| 8,890,500 B2 | * | 11/2014 | Cheng | G05F 1/10 323/282 |
| 8,994,347 B2 | * | 3/2015 | Galbis | H03F 1/0216 323/271 |
| 9,356,510 B2 | * | 5/2016 | Jiang | H02M 3/156 |
| 9,455,632 B1 | | 9/2016 | Hsieh et al. | |

(Continued)

*Primary Examiner* — Yusef A Ahmed
*Assistant Examiner* — Nusrat Quddus
(74) *Attorney, Agent, or Firm* — JCIPRNET

(57) ABSTRACT

A voltage converting apparatus includes a first comparator, a second comparator, a constant on-time signal generator, a driving stage circuit, an inductor and a reference signal generator. The first comparator compares a feedback signal and a first reference signal to generate a first comparison result. The second comparator compares the first comparison result with a second reference signal to generate a second comparison result. The constant on-time signal generator generates a constant on-time signal. The reference signal generator generates the second reference signal with reducing voltage during a first time period according to an input voltage or a driving signal, and generates the second reference signal with rising voltage during a second time period according to a preset slope. The reference signal generator sets the first time period and the second time period according to the constant on-time signal.

10 Claims, 9 Drawing Sheets

(56) References Cited

U.S. PATENT DOCUMENTS

| | | | |
|---|---|---|---|
| 2009/0066305 A1* | 3/2009 | Noda | H02M 3/1588 323/282 |
| 2010/0283441 A1 | 11/2010 | Wang et al. | |
| 2011/0018515 A1* | 1/2011 | McCloy-Stevens | H02M 3/1588 323/284 |
| 2012/0112721 A1 | 5/2012 | Wu et al. | |
| 2013/0093406 A1* | 4/2013 | Cheng | G05F 1/10 323/283 |

* cited by examiner

VOLTAGE CONVERTING APPARATUS FOR IMPROVE STABILITY OF THE COMPARISON OPRERATION THEREOF

CROSS-REFERENCE TO RELATED APPLICATION

This application claims the priority benefit of Taiwan application serial no. 107111750, filed on Apr. 3, 2018. The entirety of the above-mentioned patent application is hereby incorporated by reference herein and made a part of this specification.

BACKGROUND OF THE INVENTION

Field of the Invention

The invention relates to a voltage converting apparatus, and particularly relates to a voltage converter of a constant on-time.

Description of Related Art

Along with development of electronics technology, electronic products have become indispensible tools in people's daily life. In today's electronic products, in order to provide diversified functions, the electronic products generally require power of different voltage levels. Therefore, it is a common trend to set a voltage converter in integrated circuits.

In order to generate a required output voltage, the power converter tracks a state of the output voltage to serve as a reference for controlling a voltage converting operation. Generally, the voltage converter generates a reference signal, and performs a comparison operation based on the reference signal, so as to control the voltage converting operation. In order to make the voltage converter to produce correct output voltage, a providing method of the reference signal is essential. The provided reference signal requires making the comparison operation of the voltage converter to have a large enough noise boundary, so as to guarantee stability of the voltage converting operation.

SUMMARY OF THE INVENTION

The invention is directed to a voltage converting apparatus, which is adapted to increase a noise boundary of a comparison operation, so as to improve stability of a voltage converting operation.

The invention provides a voltage converting apparatus including a first comparator, a second comparator, a constant on-time signal generator, a driving stage circuit, an inductor and a reference signal generator. The first comparator compares a feedback signal and a first reference signal to generate a first comparison result. The second comparator compares the first comparison result with a second reference signal to generate a second comparison result. The constant on-time signal generator receives the second comparison result, and generates a constant on-time signal according to the second comparison result. The driving stage circuit receives the constant on-time signal to generate a driving signal. The inductor is coupled to the driving stage circuit, and executes a voltage converting operation according to the driving signal, and outputs an output voltage. The reference signal generator adjusts the second reference signal to generate the second reference signal with reducing voltage during a first time period according to an input voltage or the driving signal, and generates the second reference signal with a voltage rising along a preset slope during a second time period. The reference signal generator sets the first time period and the second time period according to the constant on-time signal, and the feedback signal is generated according to the output voltage.

In an embodiment of the invention, the reference signal generator generates a discharge current according to the input voltage or the driving signal, and generates the second reference signal with reducing voltage during the first time period according to the discharge current.

In an embodiment of the invention, a current magnitude of the discharge current is proportional to a voltage magnitude of the input voltage or the driving signal.

In an embodiment of the invention, a current magnitude of the discharge current is inversely proportional to a length of the first time period.

In an embodiment of the invention, the reference signal generator includes a proportion adjustor and a current source. The proportion adjustor receives the input voltage or the driving signal, and adjusts the input voltage or the driving signal according to a preset proportion, so as to generate a proportion adjusting result. The current source receives the proportion adjusting result, and sets a current value of the discharge current according to the proportion adjusting result.

In an embodiment of the invention, the reference signal generator further includes a switch. The switch is connected in series on a flow path of the discharge current, and is turned on/off according to the constant on-time signal.

In an embodiment of the invention, the reference signal generator receives a third reference signal, and pulls up the second reference signal according to the preset slope through the third reference signal during the second time period.

In an embodiment of the invention, the reference signal generator includes a voltage generator and a resistance capacitance (RC) delay circuit. The voltage generator receives the third reference signal, and generates the second reference signal according to the third reference signal. The RC delay circuit is coupled to an output terminal of the voltage generator, and provides a delay to generate the preset slope, and controls a rising state of a voltage value of the second reference signal according to the preset slope.

In an embodiment of the invention, the reference signal generator further receives the output voltage, and generates the second reference signal with reducing voltage during the first time period according to the output voltage and one of the input voltage and the driving signal.

In an embodiment of the invention, the reference signal generator divides the output voltage by one of the input voltage and the driving signal to obtain a proportion value, and controls a reducing speed and a reducing voltage value of the second reference signal with reducing voltage during the first time period according to the proportion value.

In an embodiment of the invention, the reference signal generator includes a ramp voltage generator and a voltage subtractor. The ramp voltage generator receives one of the input voltage and the driving signal, the output voltage and the constant on-time signal, and generates a ramp voltage according to one of the input voltage and the driving signal, the output voltage and the constant on-time signal. The voltage subtractor receives a third reference signal and the ramp voltage, and subtracts the third reference signal by the ramp voltage to generate the second reference signal.

In an embodiment of the invention, the constant on-time signal generator includes an on-time trigger and an integrator. The on-time trigger generates an on-time trigger signal according to the second comparison result. The integrator is coupled to the on-time trigger. The integrator executes an integration operation according to the on-time trigger signal, so as to generate the constant on-time signal.

In an embodiment of the invention, the driving stage circuit includes a control signal generator, a first transistor and a second transistor. The control signal generator generates a first control signal and a second control signal according to the constant on-time signal. A first terminal of the first transistor receives the input voltage, a second terminal thereof is coupled to the inductor, and a control terminal of the first transistor receives the first control signal. A first terminal of the second transistor is coupled to the inductor, a second terminal thereof is coupled to a reference ground terminal, and a control terminal of the second transistor receives the second control signal. The second terminal of the first transistor is coupled to the first terminal of the second transistor to generate the driving signal.

In an embodiment of the invention, the voltage converting apparatus further includes a feedback circuit. The feedback circuit is coupled between an output terminal of the voltage converting apparatus and the first comparator. The feedback circuit divides the output voltage to generate the feedback signal.

According to the above description, the invention provides the reference signal generator to generate the second reference signal with reducing voltage during the first time period according to the input voltage or the driving signal, and generate the second reference signal with rising voltage during the second time period based on the preset slope. Through the second reference signal with reducing voltage, a noise boundary of the comparison operation between the second reference signal and the first comparison result is increased, so as to improve the stability of the voltage converting operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
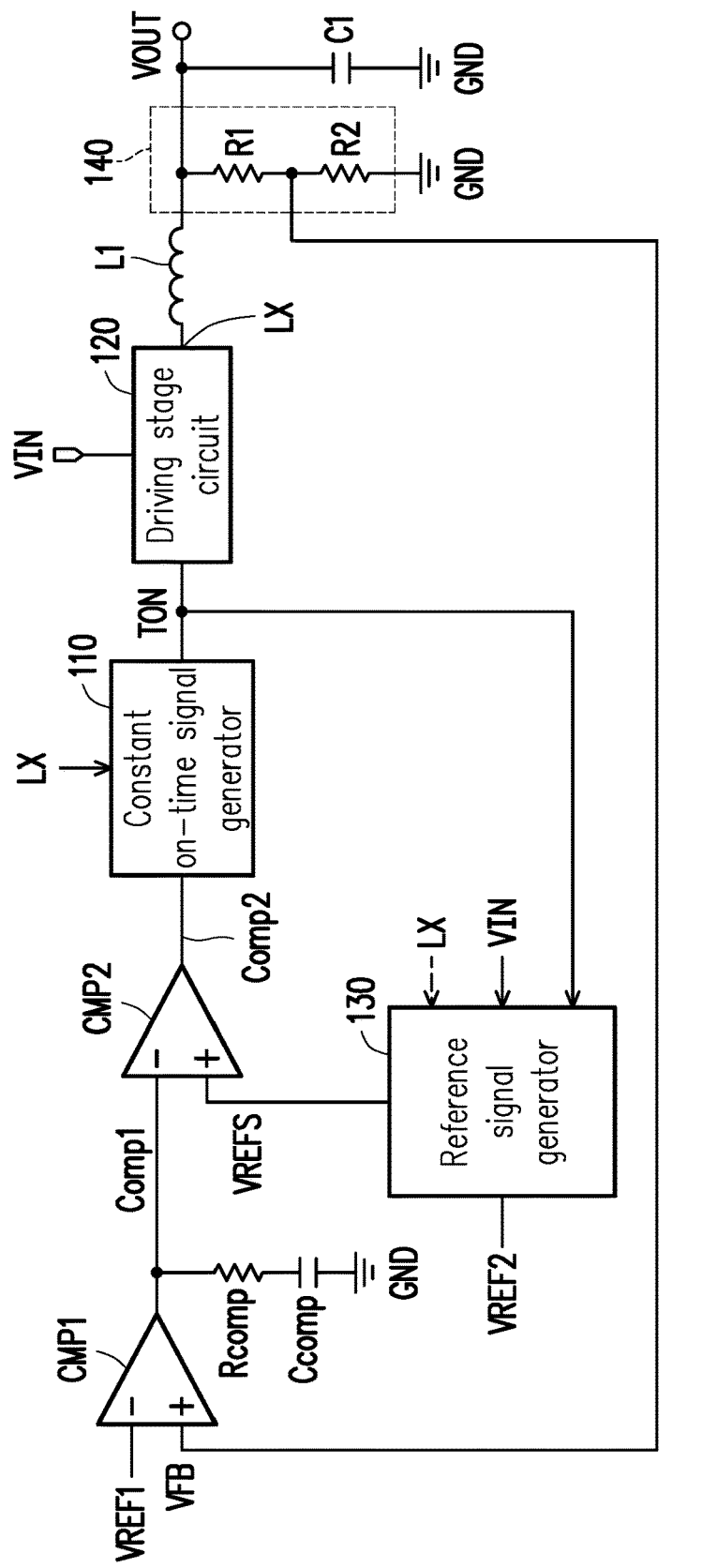
FIG. 1 is a schematic diagram of a voltage converting apparatus according to an embodiment of the invention.

Referring to FIG. 1, FIG. 1 is a schematic diagram of a voltage converting apparatus according to an embodiment of the invention. The voltage converting apparatus 100 includes comparators CMP1, CMP2, a constant on-time signal generator 110, a driving stage circuit 120, an inductor L1, a reference signal generator 130 and a feedback circuit 140. The comparator CMP1 compares a feedback signal VFB and a first reference signal VREF1 to generate a comparison result Comp1. The comparator CMP2 is coupled to an output terminal of the comparator CMP1, and receives the comparison result Comp1 through a negative input terminal thereof. A positive input terminal of the comparator CMP2 is coupled to the reference signal generator 130 to receive a reference signal VREFS. The comparator CMP2 compares the comparison result Comp1 with the reference signal VREFS to generate another comparison result Comp2.

The constant on-time signal generator 110 is coupled to the comparator CMP2, and receives the comparison result Comp2. The constant on-time signal generator 110 generates a constant on-time signal TON according to the comparison result Comp2. The constant on-time signal generator 110 provides the constant on-time signal TON to the driving stage circuit 120, and the driving stage circuit 120 executes a switch operation according to the constant on-time signal TON. The driving stage circuit 120 receives an input voltage VIN, and performs a voltage converting operation to the input voltage VIN through the aforementioned switch operation in collaboration with the inductor L1, and generates an output voltage VOUT. The driving stage circuit 120 provides a driving signal LX to the inductor L1 according to the switch operation.

It should be noted that the feedback circuit 140 receives the output voltage VOUT, and divides the output voltage VOUT to generate a feedback voltage VFB. In the embodiment, the feedback circuit 140 is composed of resistors R1 and R2 connected in series, and the resistors R1 and R2 are connected in series between the inductor L1 and a reference ground terminal GND. Moreover, a capacitor C1 is coupled in series between the output voltage VOUT and the reference ground terminal GND.

In the embodiment, the reference signal generator 130 receives one of the driving signal LX and the input signal VIN, and receives the constant on-time signal TON and the reference signal VREF2. The reference signal generator 130 sets a first time period and a second time period according to the constant on-time signal TON, and generates the reference signal VREFS with reducing voltage during the first time period according to the input voltage VIN or the driving signal LX, where a reducing speed of the reference signal VREFS during the first time period may be determined according to a voltage magnitude of the input voltage VIN or the driving signal LX. Further, an absolute value of a reducing slope of the reference signal VREFS during the first time period may be proportional to the voltage magnitude of the input voltage VIN or the driving signal LX. Moreover, during the first time period, the reference signal VREFS may be reduced to a reference ground voltage.

On the other hand, during the second time period, the reference signal generator 130 may pull up a voltage value of the reference signal VREFS according to a preset slope based on the reference signal VREF2. Namely, during the second time period, the reference signal VREFS is increased according to the preset slope, and is increased from the reference ground voltage to a voltage value of the reference signal VREF2.

Figure 2:
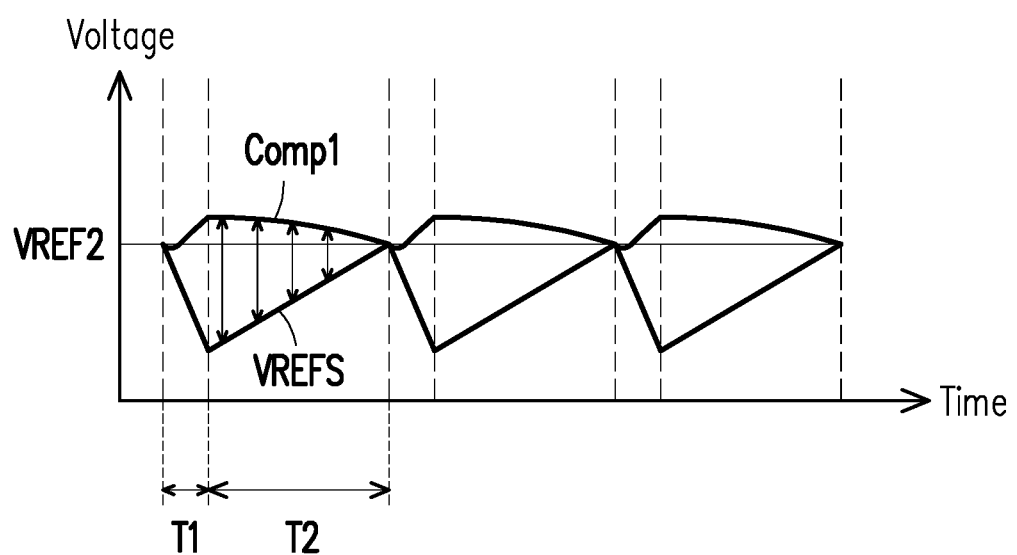
FIG. 2 is a waveform diagram of a comparison operation of a voltage converting apparatus according to an embodiment of the invention.

Referring to FIG. 1 and FIG. 2, and FIG. 2 is a waveform diagram of a comparison operation of the voltage converting apparatus according to an embodiment of the invention. At an initial time point of the first time period T1, the voltage value of the reference signal VREFS is equal to the voltage value of the reference signal VREF2, and during the first time period T1, the voltage value of the reference signal VREFS is substantially reduced linearly. Therefore, a difference between the voltage value of the reference signal VREFS and a voltage value of the comparison result Comp1 may be expanded. Namely, a noise boundary of the comparison operation performed by the comparator CMP2 may be effectively expanded, so as to guarantee correctness of the generated comparison result Comp2.

On the other hand, during the second time period T2, the voltage value of the reference signal VREFS is gradually increased according to a preset slop, and at an end time point of the second time period T2, the voltage value of the reference signal VREFS is substantially increased to be equal to the voltage value of the reference signal VREF2.

It should be noted that according to FIG. 2, it is known that the operation of adjusting the voltage value of the reference signal VREFS is repeated periodically, and the reference signal VREFS is periodically provided to the comparator CMP2 to execute the comparison operation.

Moreover, a time length of the first time period T1 may be determined according to a time length that the constant on-time signal TON is maintained to be equal to a first logic level (for example, a high logic level). Comparatively, a time length of the second time period T2 may be determined according to a time length that the constant on-time signal TON is maintained to be equal to a second logic level (for example, a low logic level). The first time period T1 and the second time period T2 may be alternately occurred consecutively, and the first time period T1 and the second time period T2 are not overlapped with each other.

Referring back to FIG. 1, the voltage converting apparatus 100 of the embodiment further includes capacitors C1, Ccomp and a resistor Rcomp. The resistor Rcomp and the capacitor Ccomp are connected in series between the output terminal of the comparator CMP1 and the reference ground terminal GND. The capacitor C1 is coupled between the reference ground terminal GND and an output terminal of the voltage converting apparatus 100, where the output terminal of the voltage converting apparatus 100 is used for generating the output voltage VOUT.

Figure 3A:
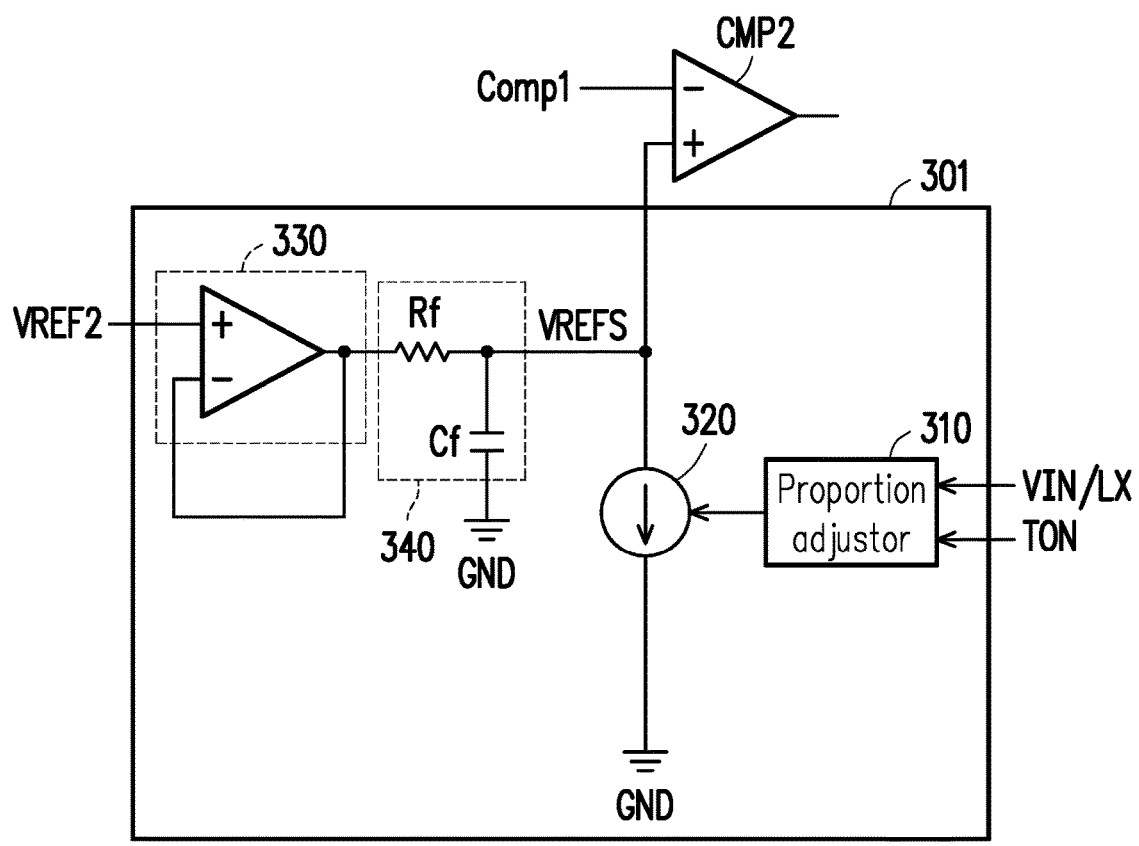
FIG. 3A is a schematic diagram of an implementation of a reference signal generator according to an embodiment of the invention.

Referring to FIG. 3A, FIG. 3A is a schematic diagram of an implementation of a reference signal generator according to an embodiment of the invention. The reference signal generator 301 includes a proportion adjustor 310, a current source 320, a voltage generator 330 and a resistance capacitance (RC) delay circuit 340. The proportion adjustor 310 receives the input voltage VIN or the driving signal LX, and adjusts amplitude of the input voltage VIN or the driving signal LX according to a preset proportion, so as to generate a proportion adjusting result. For example, if the preset proportion is k, the proportion adjusting result may be equal to k×VIN or k×LX.

The current source 320 is coupled to the proportion adjustor 310, and is connected in series between the comparator CMP2 and the reference ground terminal GND. The current source 320 receives the proportion adjusting result, and generates a discharge current according to the proportion adjusting result, where a current value of the discharge current may be proportional to the proportion adjusting result. For example, the current value of the discharge current may be equal to a product of the proportion adjusting result and a transconductance (gm). The current source 320 may be a voltage controlled current source.

It should be noted that the current source 320 further receives the constant on-time signal TON, and determines whether to output the discharge current according to the constant on-time signal TON. In an embodiment of the invention, when the constant on-time signal TON has the high logic level, the current source 320 outputs the discharge current. Comparatively, when the constant on-time signal TON has the low logic level, the current source 320 stops outputting the discharge current or reduces the discharge current. To be noted, during the first time period, the current source 320 provides the discharge current to pull down a voltage level of the reference signal VREFS according to the discharge current. During the second time period, the current source 320 stops to output the discharge current or reduces the discharge current.

The voltage generator 330 receives the reference signal VREF2, and pulls up the voltage level of the reference signal VREFS according to the reference signal VREF2 during the second time period. An output terminal of the voltage generator 330 is coupled to the RC delay circuit 340. The RC delay circuit 340 is composed of a resistor Rf and a capacitor Cf. The resistor Rf and the capacitor Cf are connected in a low-pass filter configuration to make the voltage level of the reference signal VREFS to increase according to a preset slope during the second time period. The preset slope may be determined according to a RC time constant formed by the resistor Rf and the capacitor Cf.

In the present embodiment, the voltage generator 330 is implemented by a voltage follower. In other embodiments of the invention, the voltage generator 330 may also be implemented by a voltage generation circuit well known by those skilled in the art. The voltage generator 330 shown in FIG. 3A is only an example, which is not used for limiting the scope of the invention.

Figure 3B:
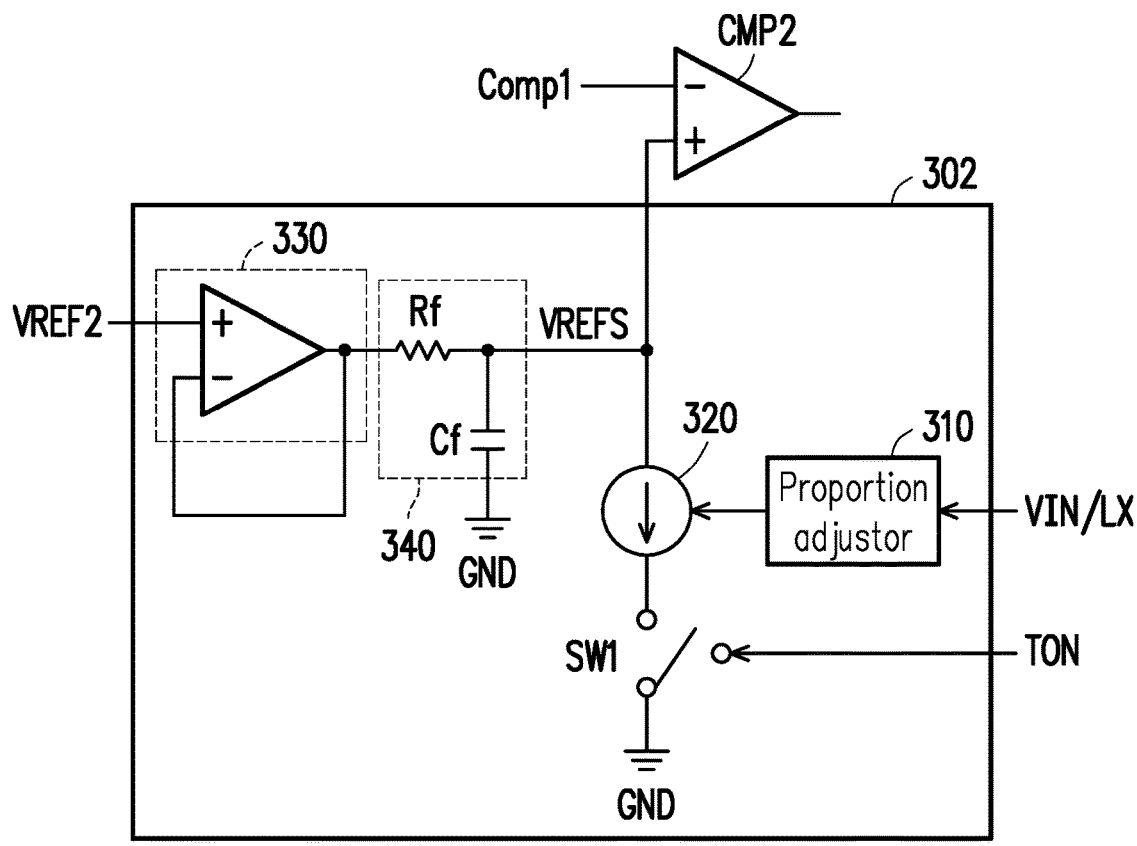
FIG. 3B is a schematic diagram of a reference signal generator according to another embodiment of the invention.

Referring to FIG. 3B, FIG. 3B is a schematic diagram of a reference signal generator according to another embodiment of the invention. Different to the above embodiment, the reference signal generator 302 further includes a switch SW1. The switch SW1 is connected in series between the current source 320 and the reference ground terminal GND on a flow path of the discharge current. The switch SW1 is controlled by the constant on-time signal TON, and is turned on during the first time period, and is turned off during the second time period.

Figure 4A:
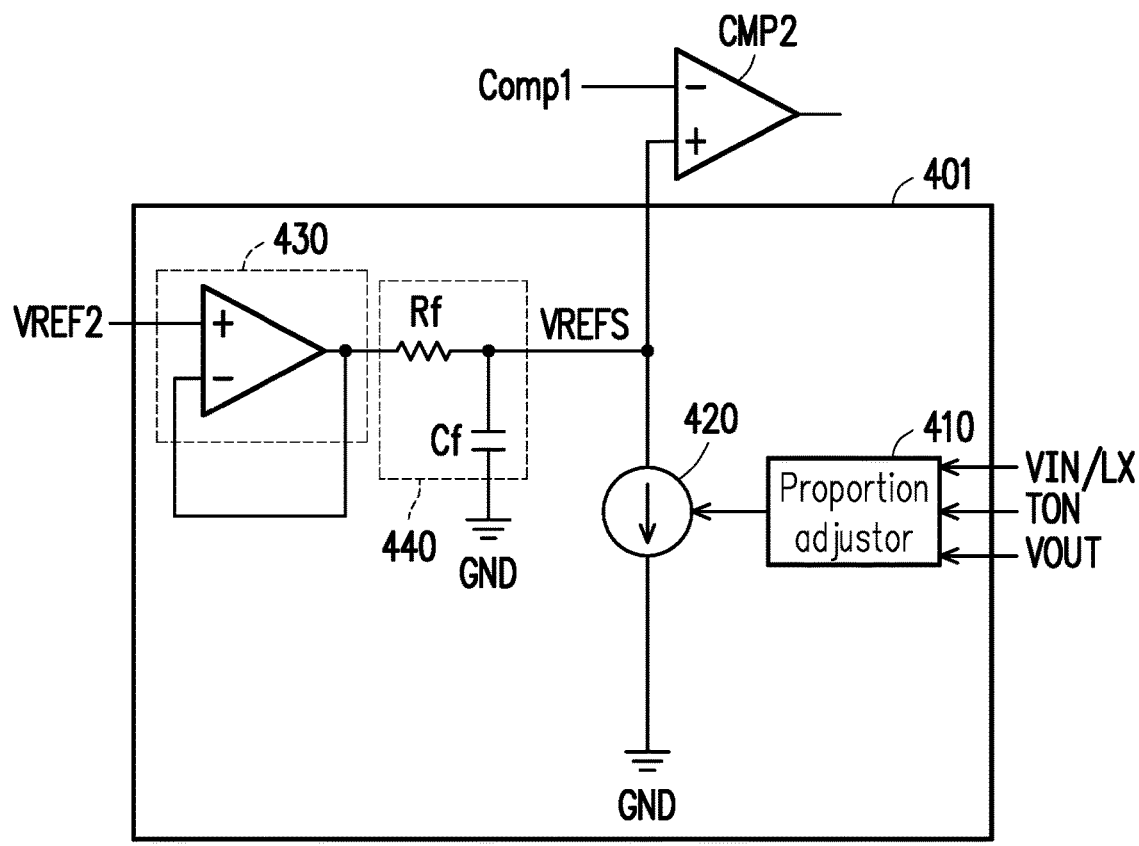
FIG. 4A and FIG. 4B are schematic diagrams of other implementations of a reference signal generator according to an embodiment of the invention.
Figure 4B:
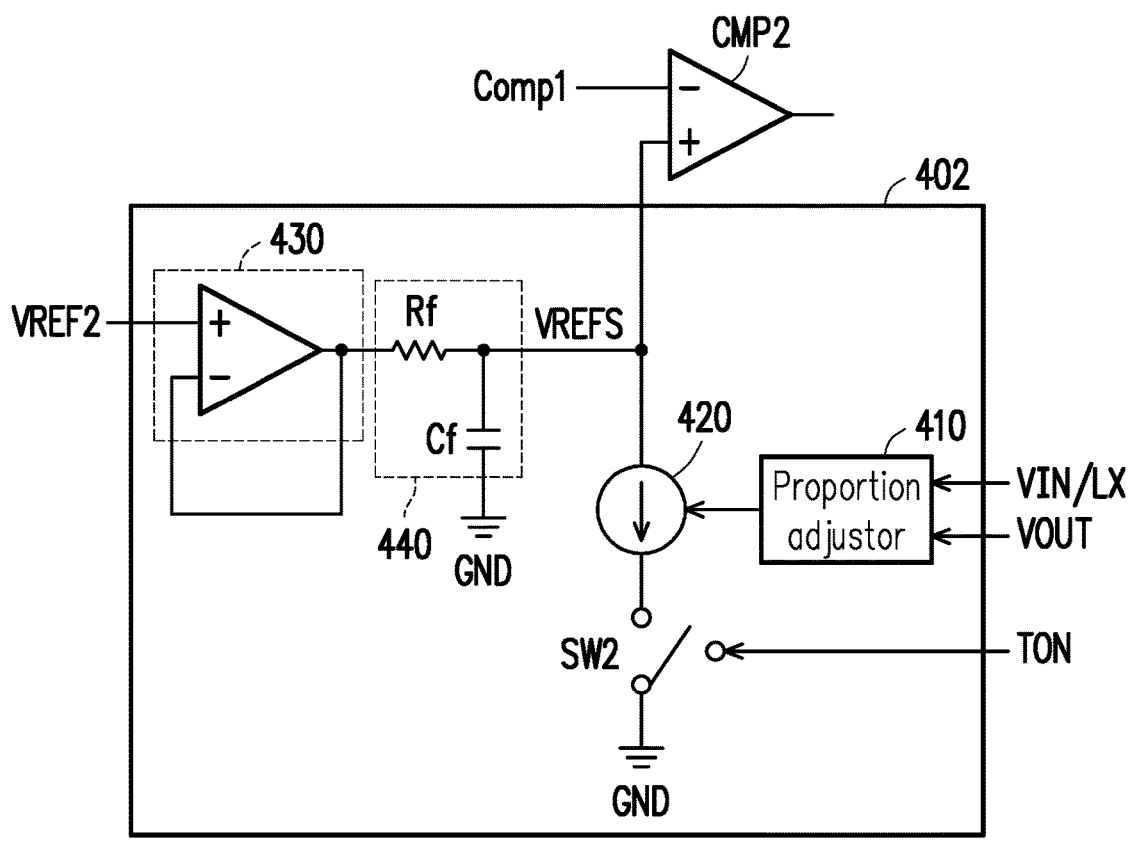

Then, referring to FIG. 4A and FIG. 4B, FIG. 4A and FIG. 4B are schematic diagrams of other implementations of the reference signal generator according to an embodiment of the invention. In FIG. 4A, the reference signal generator 401 includes a proportion adjustor 410, a current source 420, a voltage generator 430 and a RC delay circuit 440. Different to the embodiment of FIG. 3, the proportion adjustor 410 receives the output voltage VOUT and the constant on-time signal TON, and receives one of the input voltage VIN and the driving signal LX. The proportion adjustor 410 may divide the output voltage VOUT by the input voltage VIN or the driving signal LX to obtain a proportion value, and provides a preset proportion k to multiply the proportion value, such that the current source 420 generates the discharge current according to a product of the preset proportion k and the proportion value. In this way, a reducing speed and a magnitude of an absolute value of the reducing slope of the reference signal VREFS generated by the reference signal generator 401 during the first time period may be related to the output voltage VOUT (for example, a negative correlation).

Moreover, in FIG. 4B, compared to FIG. 4A, the reference signal generator 402 further includes a switch SW2, where the switch SW2 is controlled by the constant on-time signal TON, and is turned on or turned off according to the constant on-time signal TON. In the embodiment, the switch SW2 is turned on according to the constant on-time signal TON during the first time period. Comparatively, the switch SW2 is turned off according to the constant on-time signal TON during the second time period.

Figure 5:
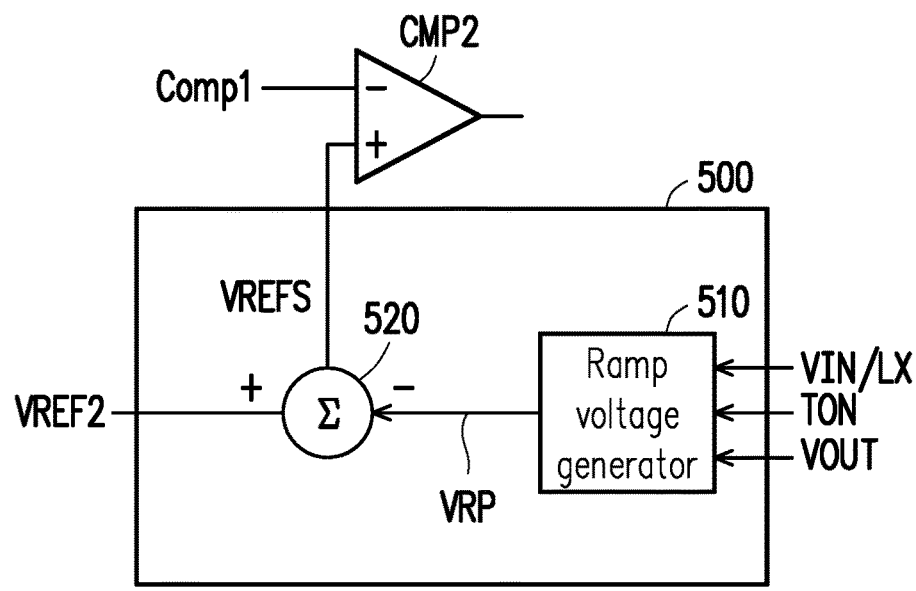
FIG. 5 is another implementation of a reference signal generator according to an embodiment of the invention.

Referring to FIG. 5, FIG. 5 is another implementation of a reference signal generator according to an embodiment of the invention. The reference signal generator 500 includes a ramp voltage generator 510 and a voltage subtractor 520. The ramp voltage generator 510 receives one of the input voltage VIN and the driving signal LX, and receives the output voltage VOUT and the constant on-time signal TON. The ramp voltage generator 510 generates a ramp voltage VRP according to one of the input voltage VIN and the driving signal LX, the output voltage VOUT and the constant on-time signal TON. The voltage subtractor 520 receives the ramp voltage VRP and the reference signal VREF2, and subtracts the reference signal VREF2 by the ramp voltage VRP to generate the reference signal VREFS, and provides the reference signal VREFS to the comparator CMP2.

It should be noted that the ramp voltage generator 510 may set the first time period and the second time period according to the constant on-time signal TON, and perform adjustments of different trends on the ramp voltage VRP during the first time period and the second time period. To be specific, the ramp voltage generator 510 may provide the ramp voltage VRP with a voltage value rising along with time (for example, rising from 0 volt) during the first time period, where a reducing slope of the voltage value of the ramp voltage VRP during the first time period may be determined according to the output voltage VOUT and one of the input voltage VIN and the driving signal LX. The ramp voltage generator 510 may provide the ramp voltage VRP with the voltage value reducing along with time during the second time period. Moreover, at the end time point of the second time period, the voltage value of the ramp voltage VRP may be close to 0 volt.

The hardware frameworks of the ramp voltage generator 510 and the voltage subtractor 520 may be respectively implemented by a triangular wave generation circuit and a voltage subtraction circuit well known by those skilled in the art, which are not particularly specified.

Figure 6:
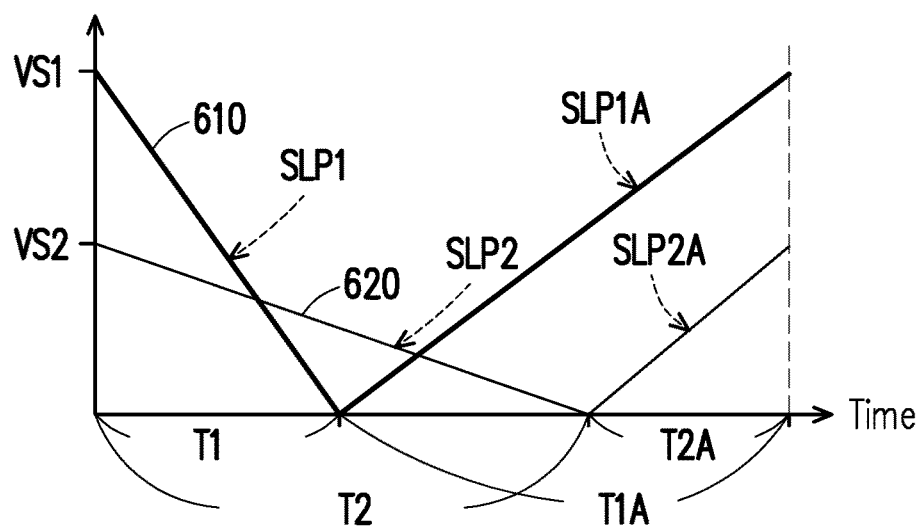
FIG. 6 is a schematic diagram of an operation method of a voltage converting apparatus according to an embodiment of the invention.

Referring to FIG. 6, FIG. 6 is a schematic diagram of an operation method of a voltage converting apparatus according to an embodiment of the invention. FIG. 6 illustrates relationship curves of a reference signal generated by the voltage converting apparatus of the invention and an operation time period thereof. The voltage converting apparatus of the invention may define different first time periods T1 and T2 according to different constant on-time signals. When the reference signal generator defines the shorter first time period T1 according to the constant on-time signal, the reference signal generator may generate a corresponding reference signal according to a curve 610. The curve 610 may have a higher start voltage VS1 and a larger slope absolute value SLP1, and is quickly reduced during the first time period T1. On the other hand, when the reference signal generator defines the longer first time period T2 according to the constant on-time signal, the reference signal generator may generate a corresponding reference signal according to a curve 620. The curve 620 may have a lower start voltage VS2 and a smaller slope absolute value SLP2, and is slowly reduced during the first time period T2. Comparatively, the start voltages VS1 and VS2 may be regarded to correspond to a same reference voltage in different operation states, and the reference signals may have the start voltages VS1 and VS2 of different voltage values, and may have voltage variation curves 610, 620 with different slopes that only have different absolute values. Moreover, during a time period T1A after the time period T1, the curve 610 may have a slope absolute value SLP1A and rises, and a rising final value thereof is the start voltage VS1. During a time period T2A after the time period T2, the curve 620 may have a slope absolute value SLP2A and rises, and a rising final value thereof is the start voltage VS2.

According to FIG. 6, it is known that in the embodiment of the invention, the amplitude and the slope of the reference signal generated by the reference signal generator are not fixed, and may be related to the constant on-time signal. Therefore, the reference signal may be matched to a magnitude of the current flowing through the inductor and a slope absolute value thereof in the voltage converting apparatus, so as to improve the working performance and stability of the voltage converting apparatus, and meanwhile improve a transient response.

Figure 7:
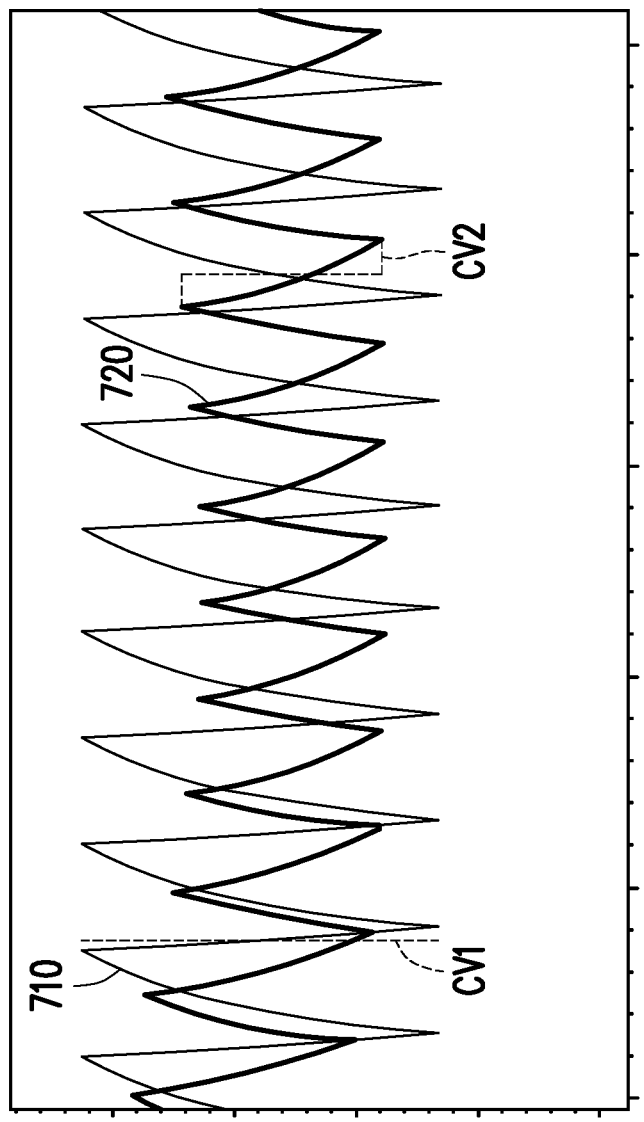
FIG. 7 is a waveform diagram of a reference signal generated by a reference signal generator according to an embodiment of the invention.

Referring to FIG. 7, FIG. 7 is a waveform diagram of the reference signal generated by the reference signal generator according to an embodiment of the invention. A waveform 710 is a waveform of the reference signal produced when the voltage converting apparatus perform a voltage converting operation of a lower duty cycle. According to a dotted line CV1, it is known that the reference signal of the waveform 710 has higher voltage amplitude, and has a larger slope absolute value when the voltage is reduced. Comparatively, a waveform 720 is a waveform of the reference signal produced when the voltage converting apparatus perform the voltage converting operation of a higher duty cycle. According to a dotted line CV2, it is known that the reference signal of the waveform 720 has lower voltage amplitude, and has a smaller slope absolute value when the voltage is reduced.

Figure 8:
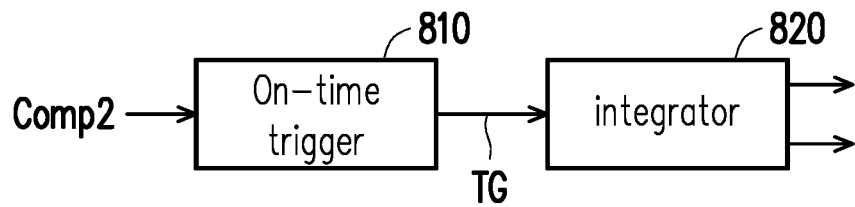
FIG. 8 is a schematic diagram of an implementation of a constant on-time signal generator according to an embodiment of the invention.

Referring to FIG. 8, FIG. 8 is a schematic diagram of an implementation of a constant on-time signal generator according to an embodiment of the invention. The constant on-time signal generator 800 includes an on-time trigger 810 and an integrator 820. The on-time trigger 810 generates an on-time trigger signal TG according to the comparison result Comp2. The integrator 820 is coupled to the on-time trigger 810, and executes an integration operation according to the on-time trigger signal TG, so as to generate the constant on-time signal TON.

The hardware frameworks of the on-time trigger 810 and the integrator 820 may be respectively implemented by an on-time trigger circuit and an integration circuit well known by those skilled in the art in the constant on-time voltage converting apparatus, which are not particularly specified.

Figure 9:
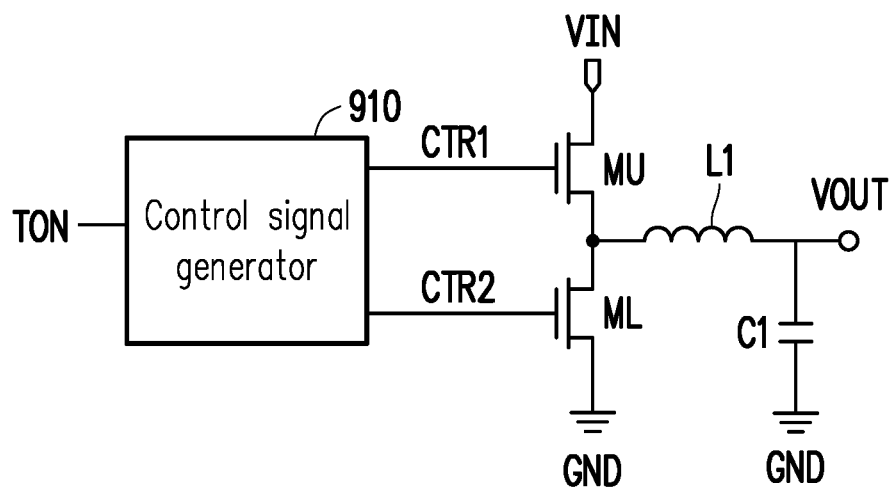
FIG. 9 is a schematic diagram of an implementation of a driving stage circuit 900 according to an embodiment of the invention.

Referring to FIG. 9, FIG. 9 is a schematic diagram of an implementation of a driving stage circuit 900 according to an embodiment of the invention. The driving stage circuit 900 includes a control signal generator 910 and transistors MU, ML. The control signal generator 910 generates control signals CTR1 and CTR2 according to the constant on-time signal TON. The control signals CTR1, CTR2 respectively control to turn on/off the transistors MU, ML. The transistor MU is used for pulling up a voltage level of the generated driving voltage LX according to the input voltage VIN when the transistor MU is turned on, and the transistor ML is used for pulling down the voltage level of the generated driving voltage LX when the transistor ML is turned on. The transistors MU and ML may not be simultaneously turned on. The driving voltage LX is provided to the inductor L1, so as to produce the output voltage VOUT with a filter consisting of the capacitor C1 through the voltage converting operation at another end of the inductor L1.

The hardware framework of the control signal generator 910 may be implemented by a control signal generation circuit well known by those skilled in the art in the constant on-time voltage converting apparatus, which are not particularly specified.

In summary, the reference voltage generator is adopted to provide the reference signal adapted to expand the noise boundary, so as to improve stability of the comparison operation executed in the voltage converting apparatus, and improve the performance of the reference voltage generator.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A voltage converting apparatus, comprising:
a first comparator, comparing a feedback signal and a first reference signal to generate a first comparison result;
a second comparator, comparing the first comparison result with a second reference signal to generate a second comparison result;
a constant on-time signal generator, receiving the second comparison result, and generating a constant on-time signal according to the second comparison result;
a driving stage circuit, receiving the constant on-time signal to generate a driving signal;
an inductor, coupled to the driving stage circuit, executing a voltage converting operation according to the driving signal, and outputting an output voltage; and
a reference signal generator, generating the second reference signal with reducing voltage during a first time period according to an input voltage or the driving signal, and generating the second reference signal with a voltage rising along a preset slope during a second time period,
wherein the reference signal generator sets the first time period and the second time period according to the constant on-time signal, and the feedback signal is generated according to the output voltage,
wherein the reference signal generator generates a discharge current according to the input voltage or the driving signal, and generates the second reference signal with reducing voltage during the first time period according to the discharge current, wherein a current magnitude of the discharge current is inversely proportional to a length of the first time period, wherein the reference signal generator further comprises:
a switch, connected in series on a flow path of the discharge current, and turned on/off according to the constant on-time signal;
a voltage generator, receiving a third reference signal, and generating the second reference signal according to the third reference signal; and
a resistance capacitance delay circuit, coupled to an output terminal of the voltage generator, providing a delay to generate the preset slope, and controlling a rising state of a voltage value of the second reference signal according to the preset slope.

2. The voltage converting apparatus as claimed in claim 1, wherein a current magnitude of the discharge current is proportional to a voltage magnitude of the input voltage or the driving signal.

3. The voltage converting apparatus as claimed in claim 1, wherein the reference signal generator further comprises:
a proportion adjustor, receiving the input voltage or the driving signal, and adjusting the input voltage or the driving signal according to a preset proportion, so as to generate a proportion adjusting result; and
a current source, receiving the proportion adjusting result, and setting a current value of the discharge current according to the proportion adjusting result.

4. The voltage converting apparatus as claimed in claim 1, wherein the reference signal generator receives the third reference signal, and pulls up the second reference signal according to the preset slope through the third reference signal during the second time period.

5. The voltage converting apparatus as claimed in claim 1, wherein the constant on-time signal generator comprises:
an on-time trigger, generating an on-time trigger signal according to the second comparison result; and
an integrator, coupled to the on-time trigger, and executing an integration operation according to the on-time trigger signal, so as to generate the constant on-time signal.

6. The voltage converting apparatus as claimed in claim 1, wherein the driving stage circuit comprises:
a control signal generator, generating a first control signal and a second control signal according to the constant on-time signal;
a first transistor, having a first terminal receiving the input voltage, a second terminal coupled to the inductor, and a control terminal receiving the first control signal; and
a second transistor, having a first terminal coupled to the inductor, a second terminal coupled to a reference ground terminal, and a control terminal receiving the second control signal,
wherein the second terminal of the first transistor is coupled to the first terminal of the second transistor to generate the driving signal.

7. The voltage converting apparatus as claimed in claim 1, further comprising:
a feedback circuit, coupled between an output terminal of the voltage converting apparatus and the first comparator, and dividing the output voltage to generate the feedback signal.

8. A voltage converting apparatus, comprising:
a first comparator, comparing a feedback signal and a first reference signal to generate a first comparison result;
a second comparator, comparing the first comparison result with a second reference signal to generate a second comparison result;
a constant on-time signal generator, receiving the second comparison result, and generating a constant on-time signal according to the second comparison result;

a driving stage circuit, receiving the constant on-time signal to generate a driving signal;

an inductor, coupled to the driving stage circuit, executing a voltage converting operation according to the driving signal, and outputting an output voltage; and a reference signal generator, generating the second reference signal with reducing voltage during a first time period according to an input voltage or the driving signal, and generating the second reference signal with a voltage rising along a preset slope during a second time period, wherein the reference signal generator sets the first time period and the second time period according to the constant on-time signal, and the feedback signal is generated according to the output voltage, wherein the reference signal generator further receives the output voltage, and generates the second reference signal with reducing voltage during the first time period according to the output voltage and one of the input voltage and the driving signal, and the reference signal generator divides the output voltage by one of the input voltage and the driving signal to obtain a proportion value, and controls a reducing speed of the second reference signal with reducing voltage during the first time period according to the proportion value.

9. The voltage converting apparatus as claimed in claim 8, wherein the reference signal generator comprises:

a ramp voltage generator, receiving one of the input voltage and the driving signal, the output voltage and the constant on-time signal, and generating a ramp voltage according to one of the input voltage and the driving signal, the output voltage and the constant on-time signal a voltage subtractor, receiving a third reference signal and the ramp voltage, and subtracting the third reference signal by the ramp voltage to generate the second reference signal.

10. A voltage converting apparatus, comprising:

a first comparator, comparing a feedback signal and a first reference signal to generate a first comparison result;

a second comparator, comparing the first comparison result with a second reference signal to generate a second comparison result;

a constant on-time signal generator, receiving the second comparison result, and generating a constant on-time signal according to the second comparison result;

a driving stage circuit, receiving the constant on-time signal to generate a driving signal;

an inductor, coupled to the driving stage circuit, executing a voltage converting operation according to the driving signal, and outputting an output voltage; and a reference signal generator, generating the second reference signal with reducing voltage during a first time period according to an input voltage or the driving signal, and generating the second reference signal with a voltage rising along a preset slope during a second time period, wherein the reference signal generator sets the first time period and the second time period according to the constant on-time signal, and the feedback signal is generated according to the output voltage, wherein the constant on-time signal generator comprises:

an on-time trigger, generating an on-time trigger signal according to the second comparison result; and an integrator, coupled to the on-time trigger, and executing an integration operation according to the on-time trigger signal, so as to generate the constant on-time signal.

\* \* \* \* \*